(12) United States Patent
Yang et al.

(10) Patent No.: US 12,528,483 B2
(45) Date of Patent: Jan. 20, 2026

(54) METHOD, ELECTRONIC DEVICE AND MEDIUM FOR TARGET STATE ESTIMATION

(71) Applicant: Beijing OCGen Technology Co., Ltd., Beijing (CN)

(72) Inventors: Yunchen Yang, Shanghai (CN); Weijun Liu, Beijing (CN); Jiaming Sun, Beijing (CN); Naiyan Wang, Beijing (CN)

(73) Assignee: Beijing OCGen Technology Co., Ltd., Beijing (CN)

( * ) Notice: Subject to any disclaimer, the term of this patent is extended or adjusted under 35 U.S.C. 154(b) by 175 days.

(21) Appl. No.: 18/351,955

(22) Filed: Jul. 13, 2023

(65) Prior Publication Data

US 2024/0025428 A1   Jan. 25, 2024

(30) Foreign Application Priority Data

Jul. 15, 2022   (CN) .......................... 202210837658.2

(51) Int. Cl.
*B60W 50/06*   (2006.01)
*B60W 40/04*   (2006.01)
(Continued)

(52) U.S. Cl.
CPC ............ *B60W 50/06* (2013.01); *B60W 40/04* (2013.01); *B60W 2050/0022* (2013.01);
(Continued)

(58) Field of Classification Search
CPC ...... G01S 7/003; G01S 7/4004; G01S 13/862; G01S 13/865; G01S 13/867;
(Continued)

(56) References Cited

U.S. PATENT DOCUMENTS

2018/0009445 A1*   1/2018   Nishi ........................ G06N 7/01
2020/0125094 A1*   4/2020   Zhang .................. G05D 1/0212
(Continued)

FOREIGN PATENT DOCUMENTS

CN   108717712   10/2018
CN   108732603   11/2018
(Continued)

OTHER PUBLICATIONS

Butt et al., "Multiple Target Tracking Using Frame Triplets," Computer Vision ACCV 2012, Springer Berlin Heidelberg, Berlin, Heidelberg, Nov. 5, 2012, pp. 163-176.
(Continued)

*Primary Examiner* — Brandon Z Willis
(74) *Attorney, Agent, or Firm* — Fish & Richardson P.C.

(57) ABSTRACT

The present disclosure relates to a method for state estimation of a target comprising: obtaining an observation variable of the target at different moments through a plurality of sensors, wherein at least one observation variable is acquired by each sensor; determining a state variable of the target at different moments based on the observation variable; and optimizing the state variable of the target by minimizing a loss function. The loss function includes at least one of a position loss, an orientation loss, a velocity loss, a size loss, or a structural constraint of the target. The method of the present disclosure may obtain a sufficiently accurate state estimate. In addition, an apparatus, an electronic device, and a medium for state estimation of the target are also provided.

20 Claims, 3 Drawing Sheets

(51) Int. Cl.
*B60W 50/00* (2006.01)
*B60W 60/00* (2020.01)

(52) U.S. Cl.
CPC ... *B60W 60/0027* (2020.02); *B60W 2420/403* (2013.01); *B60W 2554/4041* (2020.02); *B60W 2554/4042* (2020.02); *B60W 2554/4044* (2020.02); *B60W 2556/45* (2020.02)

(58) Field of Classification Search
CPC ...... G01S 13/874; G01S 13/89; G01S 13/931; G01S 13/933; G01S 13/91; G01S 2013/9318; G01S 2013/93185; G01S 2013/9319; G01S 2013/9323; G01S 2013/9324; G01S 15/89; G01S 15/931; G01S 17/89; G01S 17/931; G01S 17/933; G06V 20/58; G06V 20/56; G08G 1/0125; G08G 1/052; G08G 5/20; G08G 5/72; G01C 21/1652; G01C 21/1656; G01C 21/188; B60W 40/04; B60W 50/06; B60W 2050/0022; B60W 60/0027; B60W 60/00272; B60W 2420/403; B60W 2420/408; B60W 2554/4041; B60W 2554/4042; B60W 2554/4044; B60W 2556/45

See application file for complete search history.

(56) References Cited

U.S. PATENT DOCUMENTS

| | | | | |
|---|---|---|---|---|
| 2022/0410933 | A1* | 12/2022 | Silva | B60W 60/0011 |
| 2023/0185304 | A1* | 6/2023 | Wuthishuwong | B60W 30/0956 701/26 |
| 2023/0314548 | A1* | 10/2023 | Xie | G01S 5/0264 701/445 |
| 2023/0324859 | A1* | 10/2023 | Quirynen | G05B 15/02 |
| 2024/0020870 | A1 | 1/2024 | Yang et al. | |
| 2024/0219557 | A1* | 7/2024 | Hassibi | G01S 13/865 |

FOREIGN PATENT DOCUMENTS

| | | |
|---|---|---|
| CN | 109631894 | 4/2019 |
| CN | 110296702 | 10/2019 |
| CN | 111931905 | 11/2020 |
| CN | 112733907 | 4/2021 |
| CN | 112989978 | 6/2021 |
| CN | 113076599 | 7/2021 |
| CN | 113819905 | 12/2021 |
| CN | 113945206 | 1/2022 |
| WO | WO 2022/045982 | 3/2022 |

OTHER PUBLICATIONS

Extended European Search Report in European Appln. No. 23184287.3, dated Nov. 20, 2023, 7 pages.

Partial European Search Report in European Appln. No. 23184310.3, dated Feb. 6, 2024, 17 pages.

Payne et al., "Control of a robot-trailer system using a single non-collocated sensor," IECON 2012—38th Annual Conference on IEEE Industrial Electronics Society, IEEE, Oct. 25, 2012, pp. 2674-2679.

Tang et al., "Single-Camera and Inter-Camera Vehicle Tracking and 3D Speed Estimation Based on Fusion of Visual and Semantic Features," 2018 IEEE/CVF Conference on Computer Vision and Pattern Recognition Workshops (CVPRW), IEEE, Jun. 18, 2018, pp. 108-115.

Extended European Search Report in European Appln. No. 23184310.3, dated May 2, 2024, 14 pages.

* cited by examiner

METHOD, ELECTRONIC DEVICE AND MEDIUM FOR TARGET STATE ESTIMATION

CROSS-REFERENCE TO RELATED APPLICATIONS

The present disclosure claims priority to Chinese Patent Application No. 202210837658.2, titled "METHOD, APPARATUS, ELECTRONIC DEVICE AND MEDIUM FOR TARGET STATE ESTIMATION", filed on Jul. 15, 2022, the content of which is incorporated herein by reference in its entirety.

TECHNICAL FIELD

The present disclosure relates to the field of computers, in particular to the field of autopilot and data processing techniques, and more particularly to a method, apparatus, electronic device, computer-readable storage medium and computer program product for target state estimating.

BACKGROUND

In identifying or observing a target, it is often necessary to accurately estimate the state of a target based on target measurement data obtained by a sensor. The position of the target has a strong correlation with the change of velocity, angle, acceleration, and other parameters. For example, an important part of unmanned driving is the real-time estimation of the position, velocity, size, and orientation of other vehicles on the road, which largely determines the safety factor of unmanned driving. Therefore, in order to improve the performance of target recognition or observation variable, it is urgently needed to study more superior state estimation methods.

The methods described in this section are not necessarily those have been previously conceived or pursued. Unless otherwise indicated, it should not be assumed that any of the methods described in this section are considered prior art merely by virtue of their inclusion in this section. Similarly, the problems mentioned in this section should not be considered to have been acknowledged in any prior art unless otherwise indicated.

SUMMARY

According to an aspect of the present disclosure, provided is a target state estimating method including: acquiring an observation variable of a target at each moment through a plurality of sensors, and acquiring at least one observation variable through each sensor; determining a to-be-optimized state variable for the target based on the observation variables; and optimizing the state variable of the target at each moment by minimizing the loss function to obtain the optimized state variable of the target at each moment; wherein the loss function includes at least one of a position loss, an orientation loss, a velocity loss, a size loss, and a structural constraint of the target.

According to another aspect of the present disclosure, provided is a target state estimating apparatus including: an acquisition unit configured to acquire observation variables for a target by a plurality of sensors, wherein at least one of the observation variables is acquired by each sensor; a construction unit configured to determine a to-be-optimized state variable for the target based on the observation variables; and an optimization unit configured to optimize the state variable of the target at each moment by minimizing a loss function to obtain an optimized state variable of the target at each moment; wherein the loss function includes at least one of a position loss, an orientation loss, a velocity loss, a size loss, and a structural constraint of the target.

According to another aspect of the present disclosure, provided is an electronic device including: at least one processor; and a memory communicatively connected to the at least one processor; wherein the memory stores an instruction executable by the at least one processor, and the instruction is executed by the at least one processor to enable the at least one processor to execute the method of the present disclosure.

According to another aspect of the present disclosure, provided is a non-transitory computer-readable storage medium storing computer instructions for causing a computer to perform the method of the present disclosure.

According to one or more embodiments of the present disclosure, a target state is estimated by fusing observed data acquired by a plurality of sensors, and a constraint between the target states are formed by a loss function, such that a sufficiently accurate state estimate may be obtained, which is critical to subsequent target behavior analysis.

It is to be understood that the description in this section is not intended to identify key or critical features of the embodiments of the present invention, nor is it intended to limit the scope of the invention. Other features of the invention will become readily apparent from the following description.

BRIEF DESCRIPTION OF THE DRAWINGS

The accompanying drawings, which are incorporated in and constitute a part of this description, illustrate embodiments and, together with the description, serve to explain exemplary implementations of the embodiments. The illustrated embodiments are for illustrative purposes only and do not limit the scope of the claims. Throughout the drawings, the same reference numerals indicate similar, but not necessarily identical elements.

DETAILED DESCRIPTION

Figure 1:
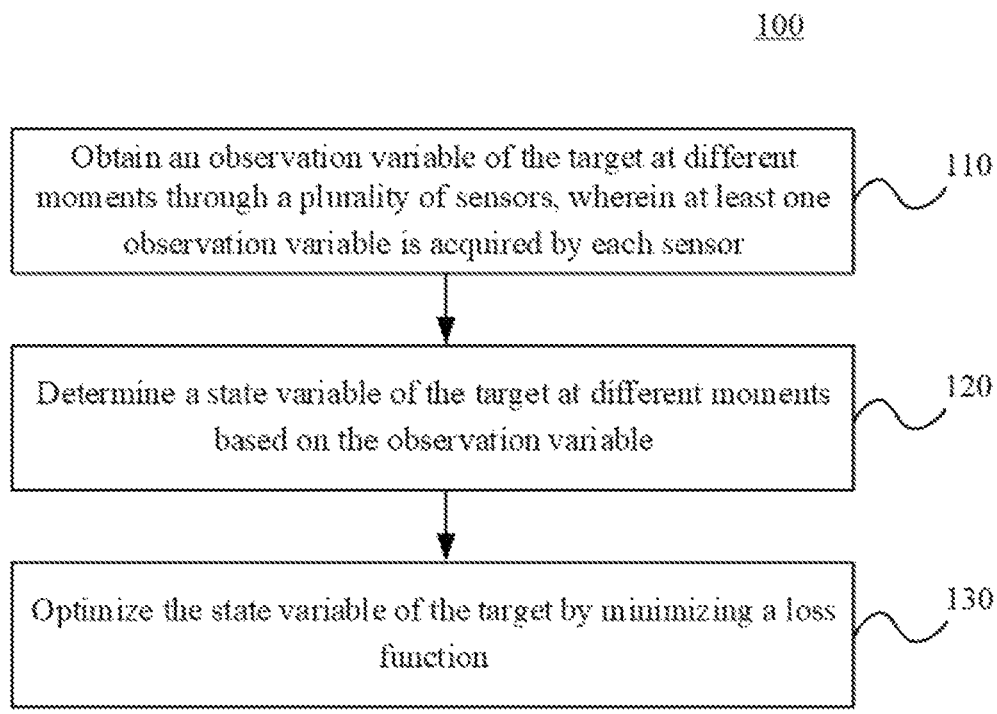
FIG. 1 is a flowchart illustrating a target state estimating method according to an exemplary embodiment.

Exemplary embodiments of the invention are described below in connection with the accompanying drawings, in which various details of the disclosed embodiments are included to facilitate understanding and are to be considered exemplary only. Accordingly, a person skilled in the art in the art will recognize that various changes and modifications may be made to the embodiments described herein without departing from the scope of the present disclosure. Also, descriptions of well-known functions and structures are omitted from the following description for clarity and conciseness.

In the present disclosure, the use of the terms "first", "second", etc. to describe various elements is not intended to limit the positional, temporal, or importance relationships of the elements unless otherwise indicated, and such terms are used solely to distinguish one element from another. In some examples, a first element and a second element may refer to the same instance of the element, and in some cases, they may refer to different instances based on the context.

The terminology used in the description of the various illustrated examples in the present disclosure is for the purpose of describing examples only and is not intended to be limiting. Unless the context clearly indicates otherwise, if the number of an element is not expressly limited, the element may be one or more. Furthermore, the term "and/or" as used in the present disclosure encompasses all possible combinations of the listed items.

An important part of unmanned driving is the real-time estimation of the position, velocity, size and orientation of other vehicles on the road, which largely determines the safety factor of unmanned driving. The information such as the velocity and the position of the vehicle may be observed by a corresponding observation model. The data observed by the observation model usually exert an impact of noise or the like, so that the observed data has an error with the actual driving data of the vehicle. It is therefore necessary to correct this observation variable data, i.e. to estimate the physical state of the vehicle during its travel from the observation variable data.

Generally, in a state estimation process, a certain state is estimated based on corresponding observation variable data, for example, a vehicle velocity state is estimated based on observed velocity information, a vehicle position state is estimated based on observed coordinates of a vehicle center point, etc. However, for the same vehicle, there is a strong correlation between various types of observation variables. In order to improve the accuracy of state estimation and avoid the wrong estimation of state when a single observation model fails, the data observed by multiple observation models may be fused to estimate the vehicle state more comprehensively and three-dimensionally, and the safety factor of unmanned driving may be improved.

Accordingly, embodiments of the present disclosure provide a target state estimating method including: acquiring an observation variable of a target at each moment through a plurality of sensors, and acquiring at least one observation variable through each sensor; determining a to-be-optimized state variable for the target based on the observation variables; and optimizing the state variable of the target at each moment by minimizing the loss function to obtain the optimized state variable of the target at each moment. The loss function includes at least one of a position loss, an orientation loss, a velocity loss, a size loss, and a structural constraint of the target.

According to an embodiment of the present disclosure, a target state is estimated by fusing observation variable data acquired by a plurality of sensors, and a constraint between the target states is formed by a loss function, so that a sufficiently accurate and robust state estimation result may be obtained, which is crucial for subsequent target behavior analysis.

FIG. 1 shows a flowchart of a target state estimating method according to an embodiment of the present disclosure. As shown in FIG. 1, in step 110, values of observation variables of a target at various moments are acquired by a plurality of sensors, wherein at least one of the observation variables is acquired by each sensor.

According to an embodiment of the present disclosure, the target may include a vehicle. Thus, according to some embodiments, the observation variable may include: at least one of a velocity, a position, and an orientation of the target vehicle at each moment; and a size of the target vehicle which may include at least one of a length, a width, and a height.

According to some embodiments, the plurality of sensors may include at least one of: an image acquisition apparatus and a point cloud acquisition apparatus. Illustratively, the image acquisition device may include a wide variety of devices, such as a vision camera, an infrared camera, a camera that performs ultraviolet or X-ray imaging, etc. Different devices may provide different detection accuracies and ranges. The vision camera may capture information such as the running state of the target in real time. Infrared cameras may capture targets at night. Ultraviolet or X-ray imaging cameras may image targets in various complex environments (nighttime, inclement weather, electromagnetic interference, etc.). The point cloud acquisition apparatus may also include a wide variety of devices such as LiDAR, millimeter wave radar, ultrasonic sensors, etc. Different devices may provide different detection accuracies and ranges. Lidar may be used to detect the edge and shape information of a target to perform target identification and tracking. Millimeter-wave radar may be used to measure a distance to a target using characteristics of an electromagnetic wave. The ultrasonic sensor may be used to measure the distance to the target by using the characteristics of strong ultrasonic directivity. Due to the Doppler effect, the radar device may also measure velocity changes with moving targets.

According to some embodiments, the plurality of sensors may be located on at least one observation vehicle or roadside device. By way of example, while an autonomously driven vehicle is traveling, various sensors may be mounted in front of, behind, or other locations on the vehicle to enable real-time observation variable of surrounding vehicles. Alternatively, a variety of sensors are located on the roadside device to make real-time observation variable of targets such as vehicles and pedestrians traveling through the roadside device.

In some examples, the roadside equipment may include electronic device, communication equipment, etc. and the h may be integrated with the communication equipment or provided separately. The electronic device may acquire the data observed by the various sensors, perform data processing and calculations to obtain corresponding observation variables, and transmit the processed and calculated results to the computing device via the communication device. Alternatively, the electronic device may be disposed at the cloud to acquire data observed by various sensors on the roadside device through the communication device and to obtain corresponding observation variables through data analysis and calculation.

According to some embodiments, a target state estimating method according to the present disclosure may be implemented in a computing device that obtains at least one observation variable through each sensor. That is, the observation variables of the targets acquired by various sensors at various moments may be analyzed online or offline by a computing device. The computing device may reside on at least one observation vehicle, on a roadside device, or on a cloud, without limitation.

According to some embodiments, the observation variables may be derived from an observation model for each sensor. Illustratively, the observation model includes at least one of: an image-based binocular ranging algorithm, an image-based monocular ranging algorithm, a point cloud-based ranging algorithm, an image-map-based projection ranging algorithm, and a point cloud-map-based projection ranging algorithm.

In the present disclosure, the observation model may perform analysis and calculation based on data acquired by the sensor to output an observation variable at each moment corresponding to the target. Specifically, in some examples, a center point coordinate of a surrounding vehicle and four angular point coordinates of a detection box, etc. may be obtained based on a projection ranging algorithm; the coordinates of the center points of the surrounding vehicles, the velocities, etc. may be obtained by a distance measurement algorithm based on a binocular distance measurement algorithm, a monocular distance measurement algorithm, etc.

According to some embodiments, the target is a multilevel structure, and the structural constraint includes a structural constraint among the multilevel structures. At this time, the observation variable may include observation variables respectively corresponding to at least two levels in the multilevel structure.

Illustratively, in the embodiment where the target vehicle is a truck, the target vehicle may be a truck having a two-stage configuration, i.e., a first stage of the truck being a tractor and a second stage of the truck being a trailer, the coupled axle (or hinge) structure between the tractor and trailer forming a structural constraint therebetween.

Figure 2:
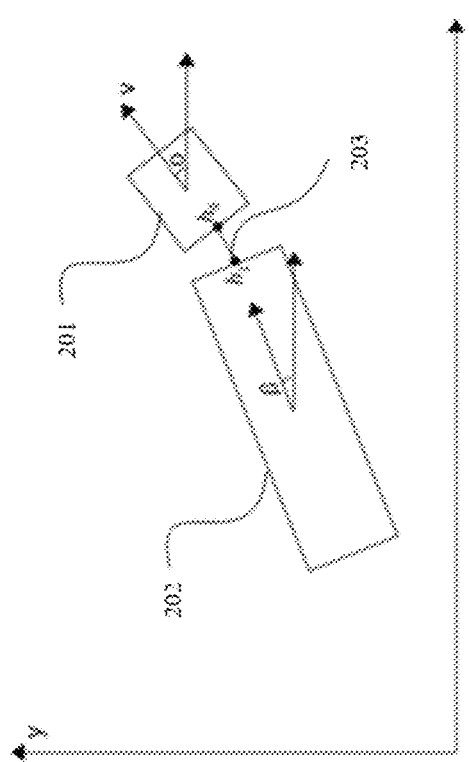
FIG. 2 is a schematic diagram illustrating a truck motion model according to an exemplary embodiment.

FIG. 2 shows a schematic diagram of a truck motion model according to an embodiment of the present disclosure. As shown in FIG. 2, a tractor 201 and a trailer 202 are connected by a pivot structure 203. In some embodiments, the tractor 201 may be processed based on a motion model of the vehicle containing only the primary structure, but the observation variable of the motion of the trailer imposes constraints on the observation variable of the motion of the tractor. The vehicle including only the primary structure may be, for example, a monocycle, an ordinary four-wheeled vehicle, or the like.

Figure 3:
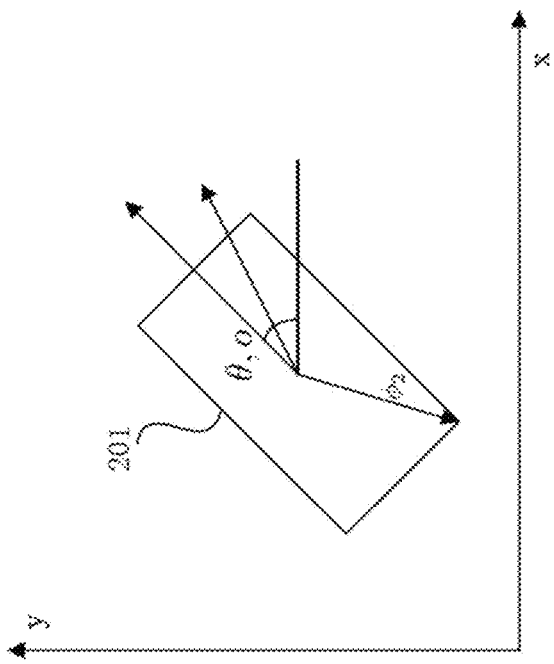
FIG. 3 is a schematic diagram illustrating a motion model of a vehicle including only a first component according to an exemplary embodiment.

FIG. 3 shows a schematic diagram of a vehicle motion model including only a primary structure according to an embodiment of the present disclosure. In some examples, the velocity direction of the vehicle is distinguished from the orientation direction to improve the accuracy of the vehicle state estimation. In the motion model shown in FIG. 3, o is the direction of the vehicle (i.e. the head direction), and θ is the velocity direction of the vehicle. Assuming that the vehicle has a velocity from moment $t_i$ to moment $t_{i+1}$, and there is a transformation Formula as shown in the following Formulas (1) and (2).

$$px_{i+1} = px_i + v_i \cdot \cos\theta_i \quad (1)$$

$$py_{i+1} = py_i + v_i \cdot \sin\theta_i \quad (2)$$

$px_i$ and $py_i$ respectively represent coordinates of a vehicle center point at moment $t_i$; $px_{i+1}$ and $py_{i+1}$ respectively represent coordinates of a vehicle center point at moment $t_{i+1}$; $\theta_i$ represents an angle between the vehicle velocity direction at the moment $t_i$ and the x-direction in the reference coordinate system.

In the present disclosure, the reference coordinate system is a coordinate system determined based on the observed vehicle or road measuring device in which the plurality of sensors is located. Illustratively, when a plurality of sensors is located on an observing vehicle, a reference coordinate system is used as a coordinate system describing the relationship of objects around the vehicle to the vehicle. According to different definitions, the origin thereof is also different, for example, the center of gravity may be taken as the origin, and the right-hand coordinate system extending therefrom is a reference coordinate system; or the reference coordinate system defined by Inertial Measurement Unit (IMU) takes the IMU position as the origin.

It will be appreciated that any suitable reference coordinate system is possible, for example the reference coordinate system may also have a transverse coordinate axis with the lane centerline, a longitudinal coordinate axis offset from the lane centerline, and a vertical coordinate axis perpendicular to the lane centerline, without limitation.

As described above, based on the projection ranging algorithm, four corner coordinates of the vehicle detection frame may be obtained, i.e., vehicle contour detection is achieved. Therefore, in the vehicle body frame as shown in FIG. 3, the vector of the vehicle center to the $(i)^{th}$ vehicle angular point may be expressed as shown in Formula (3).

$$\phi_i = R_{bw} \begin{bmatrix} \delta_i L \\ \eta_i W \end{bmatrix} \quad (3)$$

L and W are the length and width of the vehicle, respectively; $[\delta_i, \eta_i]$ represents the offset of the i vehicle angular point relative to the vehicle center point in the reference coordinate system, which is constant for each vehicle angular point; $R_{bw}$ represents a rotation matrix from a reference coordinate system to an East-North-Up (ENU) coordinate system, wherein $R_{bw}$ represents as shown in Formula (4).

$$R_{bw} = \begin{bmatrix} \cos o & -\sin o \\ \sin o & \cos o \end{bmatrix} \quad (4)$$

Thus, it is sufficient to determine a vehicle based on information such as velocity, orientation, size, and center point position of the vehicle.

With continued reference to FIG. 2, in some embodiments, the trailer 202 and the pivot structure 203 have generally the same orientation and thus may be handled as a rigid body structure. In addition, it may be assumed that the pivot structure 203 links the center position of the contact surfaces with the tractor 201 and trailer 202. Once the center point coordinates $p_0$, length $L_0$, and width $W_0$, of the tractor 201 are known, the center point coordinates $p_1$ of the trailer 202 are obtained, as shown in Formulas (5)-(7).

$$p_1 = p_0 + \text{offset}_0 - \text{offset}_1 \quad (5)$$

$$\text{offset}_0 = \begin{bmatrix} \cos o & -\sin o \\ \sin o & \cos o \end{bmatrix} \begin{bmatrix} -0.5L_o \\ 0 \end{bmatrix} \quad (6)$$

$$\text{offset}_1 = \begin{bmatrix} \cos\beta & -\sin\beta \\ \sin\beta & \cos\beta \end{bmatrix} \begin{bmatrix} 0.5L_1 + L_h \\ 0 \end{bmatrix} \quad (7)$$

$L_1$ is the length of the trailer, $L_h$ is the length of the pivot structure, and o and β are respectively an included angle of the tractor and trailer with respect to the x-axis direction of the reference coordinate system.

In some examples, the detection boxes of the tractor and trailer may be obtained simultaneously by a sensor such as a Lidar. The detection box of the trailer is moved from $h_1$ (when i is 1, the position of hi in FIG. 2) to $h_0$ (the position of $h_0$ in FIG. 2), assuming another observation variable of the tractor causes the observation variable of the trailer to constrain the observation variable of the tractor, as shown in Formula (8).

$$h_0 = h_1 + \begin{bmatrix} \cos\beta & -\sin\beta \\ \sin\beta & \cos\beta \end{bmatrix} \begin{bmatrix} L_h \\ 0 \end{bmatrix} \quad (8)$$

The angular velocity of the trailer may be as shown in Formula (9):

$$\dot{\beta} = \frac{v}{L_1 + L_h}\sin(o - \beta) \quad (9)$$

v represents the velocity of the tractor and g represents the angular velocity of the trailer. Various conditions of a truck may be determined from the velocity, orientation, size, pivot length of the tractor, position of the tractor.

According to some embodiments, the target is a vehicle, which may include a first component and at least one second component rotatable around the first component. The location of the target may include at least one of: a position of the first component, a position of the at least one second component, a position of the vehicle; the dimensions of the target include at least one of: a size of the first component, a size of the at least one second component, and a size of the vehicle; the orientation of the target includes at least one of: a direction of velocity, an orientation of the first component, and a direction of a lane in which the vehicle is located.

As mentioned above, a model has been described in which the target vehicle includes a two-stage structure, i.e. the target vehicle includes a first component and a second component. In some embodiments, the second component may also be a plurality of components, such as trains, multi-trailer trucks, etc., whose motion models may be referenced to the truck models described above, and will not be described in detail herein.

In some embodiments, data pre-processing may be performed on the acquired observation variables after the acquisition of the observation variables of the target at various moments by the various sensors. By way of example, abnormal observation variables may be deleted, available observation variables are retained, data formats are unified, etc., without being limited thereto.

In step 120, a to-be-optimized state variable for the target is determined based on the values of the observation variables.

According to some embodiments, the state variable includes at least one of: a state variable such as at least one of a velocity, a position, and an orientation of the target at each moment, and a velocity, a position, and an orientation of the target at each moment is an momentaneous state variable. In addition, the state variable may further include at least one of an average velocity, an average position, and an average orientation of a predetermined period of time to which the target belongs at each moment; and the size of the target.

In an embodiment where the target is of a multilevel structure, the observation variable includes an observation variable corresponding to at least two levels in the multi-level structure respectively, and the state variable includes a state variable corresponding to at least two levels in the multi-level structure respectively. As described above with reference to FIG. 2, information such as trailer and tractor dimensions, tractor position, tractor velocity, etc. is from sensors to estimate one or more state variables of the trailer and tractor, such as trailer and tractor dimensions, trailer and tractor position, orientation, velocity, etc.

Figure 4:
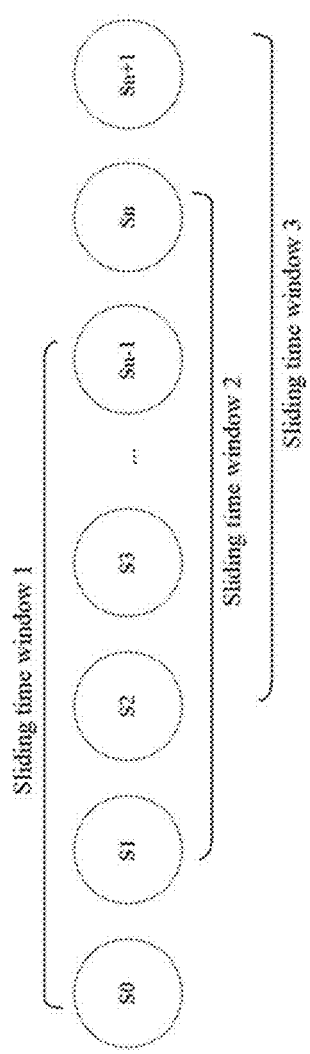
FIG. 4 is a schematic diagram illustrating a sliding time window according to an exemplary embodiment.

During driving, the vehicle can, for example, make real-time observation variables of surrounding vehicles via a plurality of sensors, so that the observation variable data are continuously generated. Thus, in some embodiments, optimization of the physical state of the vehicle may be achieved by constructing a sliding time window. Specifically, an observation variable for the target vehicle observed by at least one observation model within a sliding time window is acquired to construct a state variable describing a physical state of the target vehicle within the sliding time window based on the observation variable. When the determined to-be-optimized state variable for the target includes an average velocity, an average position, and an average orientation of a predetermined period of time to which the target belongs at each moment, the average velocity, average position and average orientation may be the average state variable of the target within the current sliding time window. FIG. 4 shows a schematic diagram of a sliding time window according to an embodiment of the present disclosure. Illustratively, the to-be-optimized state variable in the sliding time window may be constructed according to Formula (10).

$$S = [s_0, \ldots, s_{n-2}, s_{n-1}, \bar{v}^T, \bar{o}, L, W]^T \quad (10)$$

The $(i)^{th}$ frame state variable $s_i$ in the sliding time window may include, for example, the state variable shown in Formula (11).

$$s_i = [v_i^T, \theta_i, o_i] \quad (11)$$

$v_i^T$, $\theta_i$ and $o_i$ represent the velocity magnitude, the velocity direction, and the vehicle body orientation of the target vehicle. $\bar{v}^T$ represents the average velocity magnitude within the sliding time window, and $\bar{o}$ represents the average vehicle body orientation within the sliding time window.

In some examples, when the target vehicle is a secondary structure such as a truck, the velocity magnitude, velocity direction of the target vehicle may be the velocity magnitude and velocity direction of the tractor. Further, the vehicle body orientation is a tractor orientation, and the $(i)^{th}$ frame state variable $s_i$ may further include a trailer orientation $\beta_i$, i.e., $s_i = [v_i^T, \theta_i, o_i, \beta_i]$.

It will be appreciated that the length n of the sliding time window as well as the sliding step size may be set according to the actual situation and is not limiting here. In addition, the to-be-optimized state variables within the sliding time windows as shown in Formulas (10) and (11) are merely exemplary, without being limited thereto.

In step 130, the state variable of the target at each moment is optimized by minimizing a loss function including at least one of position loss, orientation loss, velocity loss, size loss and structural constraints of the target to obtain the optimized state variable of the target at each moment.

In the present disclosure, optimization of the state variable at each moment of the target is achieved by minimizing the loss function. Illustratively, where the loss function includes position loss, orientation loss, velocity loss, size loss, the loss function may be constructed based on Formula (12).

$$E = E_p + E_v + E_o + E_s \quad (12)$$

$E_p$, $E_v$, $E_o$ and $E_s$ represent position loss, orientation loss, velocity loss and size loss, respectively. The loss function is determined based on the to-be-optimized state variable. Specifically, each of the position loss, orientation loss, velocity loss, and size loss may be determined based on the to-be-optimized state variable, the observation variable corresponding to the state variable, and other observation variables that may provide constraints on the state variable.

In general, state estimation and fusion algorithms may employ state estimation techniques based on Bayesian filtering algorithms. A state estimation is performed at each moment when data is collected, and a maximum a posteriori estimation is performed on the vehicle state at each moment using a prior probability and a likelihood probability of the state. However, such techniques often require Markov assumptions that the state at the present moment is only affected by the last estimated moment, and that the state variables follow a particular distribution. In addition, when such methods are used to generate trajectories off-line, not all observation variable are used efficiently, because the state estimation for the present moment only uses the data of the present moment and all previous moments, and not the data after the present moment. In addition, methods such as the Rauch-Tung-Striebel smoothing technique, while always utilizing data, make Markov assumptions and linear Gaussian system assumptions that introduce errors for complex systems.

While in an exemplary scenario according to the present disclosure, the velocity observation variable of the target vehicle, the position of the target vehicle, etc. may provide constraints on the velocity magnitude and velocity direction of the target vehicle; in addition, the velocity prior and the average velocity of the target vehicle may also provide constraints on the velocity magnitude and the velocity direction of the target vehicle; a lane line direction, a velocity direction, a target vehicle orientation observed by a Lidar sensor, an orientation prior of the target vehicle, an average orientation, etc. may provide a constraint condition on a vehicle body orientation of the target vehicle, etc. This will be described in detail below.

In the present disclosure, the transition from single-sensor identification to multi-sensor fusion is achieved by multiple sensors acquiring observation variable of a target at various moments and constructing corresponding loss functions. Thus, during the running of the vehicle, the surrounding vehicles may be modeled in combination with the sensing results of various sensors, and the state information of the surrounding vehicles may be updated in real time, so that the unmanned system may make safe path planning based on the results, thereby avoiding traffic accidents.

According to some embodiments, the position includes a position of at least one reference point including at least one of: a center point and a contour corner point (for example, four angular points of a vehicle detection frame). The position loss includes at least one reference point residual including at least one of: a center point residual and a contour corner point residual representing a difference in an observation variable and a state variable for the center point, and the contour corner point residual representing a difference in an observation variable and a state variable for the contour corner point.

Specifically, it is assumed that the state variable of the target vehicle is optimized based on observation data obtained by L observation models, and L is a positive integer. If the center point observation variable of the $(l)^{th}$ observation model is $\{(t_k, c_k^l)\}_{k=0}^{n-1}$, a center point residual $e_k^l$ may be constructed based on the difference between the center point observation variable and the state variable. If the $(l)^{th}$ observation model further provides a contour observation, the contour observation variable is $\{(t_k, z_k^l)\}_{k=0}^{n-1}$, the contour corner point residual $u_k^l$ may be constructed based on the difference between the observation variable and the contour corner point state variable.

In some embodiments, the center point state variable may be characterized based on velocity to achieve further optimization of the velocity state variable by center point residuals. Specifically, when the observation variable includes the center point coordinate of the target vehicle at each moment within the sliding time window, and the state variable includes the velocity of the target vehicle at each moment within the sliding time window, the center point residual may be calculated from the center point coordinate of the target vehicle at each moment within the sliding time window and the velocity of the target vehicle at each moment within the sliding time window.

Specifically, it is assumed that the state variable of the target vehicle is optimized based on observation data obtained by L observation models, and L is a positive integer. If the center point observation variable of the $(l)^{th}$ observation model is $\{(t_k, c_k^l)\}_{k=0}^{n-1}$, it is determined that the first frame position coordinate corresponding to the target vehicle is $p_o$, and $e_k^l \in R^2$ represents the center point residual vector of the $(l)^{th}$ observation model at moment $t_k$, as shown in Formula (13):

$$e_k^l = p_k - c_k^l \tag{13}$$

$$\text{wherein, } p_k = (p_o + \sum_{i=0}^{k-1} v_i \Delta t_i) \tag{14}$$

$$v_i = [v_i \cos(\theta_i), v_i \sin(\theta_i)]^T \tag{15}$$

In some embodiments, the contour corner point state variable may be characterized based on the center point state variable to achieve further optimization of the center point state variable by the contour corner point residual. Specifically, when the observation variable includes contour corner point coordinates of the target vehicle at each moment in the sliding time window, the reference point residual may be calculated from: a center point coordinate of the target vehicle at an initial moment in the sliding time window, a velocity of the target vehicle at each moment in the sliding time window, a contour corner point coordinate of the target vehicle at each moment in the sliding time window, and a corresponding vector from the center point coordinate to the contour corner point coordinate of the target vehicle at each moment in the sliding time window.

Specifically, if the $(l)^{th}$ observation model also provides a contour observation, the contour observation is $\{(t_k, z_k^l)\}_{k=0}^{n-1}$, the contour corner point residual may be obtained, as shown in Formula (16).

$$u_k^l = p_k + \phi_m - z_k^l \tag{16}$$

$$\text{wherein, } \phi_m = \begin{bmatrix} \cos o_i & -\sin o_i \\ \sin o_i & \cos o_i \end{bmatrix} \begin{bmatrix} \delta_m L \\ \eta_m W \end{bmatrix} \tag{17}$$

$\phi_m$ represents the vector from the vehicle center point to the vehicle outline corner point.

As described above, in the truck motion model described with reference to FIG. 2, the trailer imposes constraints on the contour observation of the tractor. Thus, in optimizing the respective state variables of the tractor (e.g., the velocity state variables described above), constraints contour observation of the tractor may be further introduced on the basis of the reference point residuals described above.

According to some embodiments, the center point residual and the contour corner point residual respectively have corresponding weights, and the weights are both diagonal matrices; each of the center point residual and the contour corner point residual includes a transverse residual component and a longitudinal residual component having corresponding weights respectively.

In an example according to the present disclosure, when the target is a vehicle, the transverse direction may be a horizontal direction perpendicular to the approximate orientation of the target vehicle; the longitudinal direction may be a horizontal direction parallel to the approximate orientation of the target vehicle. Specifically, the "approximate orientation" may include, for example, the observed vehicle body orientation of the target vehicle, the lane orientation (i.e. lane line heading) of the lane in which the target vehicle is located, etc.

Thus, according to some embodiments, when the target is a vehicle, the transverse residual component is perpendicular to the lane direction in which the vehicle is located and the longitudinal residual component is parallel to the lane line orientation in which the vehicle is located; or the transverse residual component is perpendicular to the vehicle body orientation of the vehicle, and the longitudinal residual component is parallel to the vehicle body orientation of the vehicle.

In the present disclosure, the transverse direction and the longitudinal direction are focused on when the state variable is estimated, and the transverse direction may be decoupled from the longitudinal direction in order to facilitate model tuning. In some examples, e.g. knowing the vehicle body orientation or lane orientation observed by the radar sensor, the residuals in the ENU coordinate system may thus be rotated through the $R_{bw}$ matrix to the reference coordinate system, and the position loss function including the center point residuals and the contour corner point residuals may be as shown in Formula (18).

$$E_p = \sum_{l=1}^{L}\sum_{k=1}^{n}(\rho(\|\lambda_k^l R_{bw} e_k^l\|_2^2) + \rho(\|\mu_k^l R_{bw} u_k^l\|_2^2)) \tag{18}$$

$\rho(\bullet)$ is a robust function; $\lambda_k^l, \mu_k^l \in R^{2\times 2}$ is a weight matrix (a diagonal matrix), and different weights are respectively set for the horizontal residual and the vertical residual; $R_{bw}$ is described above with reference to Formula (4).

In the present disclosure, the robust function $\rho(\bullet)$ may be a robust function based on any suitable loss function, including but not limited to Cauchy (Lorentzian), Charbonnier (pseudo-Huber, L1-L2), Huber, Geman-McClure, smooth truncated quadratic, truncated quadratic, Tukey's biweight, etc. Illustratively, a convex loss function such as Huber may be chosen to preserve the convex optimization problem. However, the convex loss function may have limited robustness to outliers. Thus, in some examples, a non-convex loss function may be selected.

According to some embodiments, when the transverse variance of one of the center point residual and the contour corner residual is less than a predetermined threshold, the weight of the corresponding transverse residual component takes a first fixed value; when the longitudinal variance of one of the center point residual and the contour corner point residual is less than a predetermined threshold, the weight of the corresponding longitudinal residual component takes a first fixed value.

In some examples, taking a center point residual as an example, if at least one of a transverse center point variance component and a longitudinal center point variance component of the center point variance is less than a corresponding first threshold, a corresponding weight of the transverse center point residual component and the longitudinal center point residual component is a first fixed value. In addition, when at least one of the transverse center point variance components and the longitudinal center point variance component is not less than the corresponding first threshold, the weight of the at least one of the transverse center point residual component and the longitudinal center point residual component is negatively correlated with the at least one of the transverse center point variance component and the longitudinal center point variance component.

In some examples, the contour corner point residual may be similar to the center point residual described above, i.e. the weight to which the contour corner point residual corresponds is determined based on the contour corner point variance.

Specifically, the weight matrix is negatively correlated with the variance, and given the transverse variance and the longitudinal variance, the weight matrix may be expressed as shown in Formula (19):

$$\text{diag}(w_{long}\min(1, \frac{a}{\sigma_{long}}), w_{lat}\min(1, \frac{b}{\sigma_{lat}})) \tag{19}$$

$w_{long}$, $w_{lat}$, a and b are all hyperparameters. Limited by the accuracy of the observation model, small variances do not accurately reflect true errors, so a fixed weight is used when the variance is below the threshold by Formula (19). In the present disclosure, a weighting Formula similar to Formula (19) may be used for all observed loss items.

According to some embodiments, the target is a vehicle, and a transverse residual component and a longitudinal residual component in the residual of the center point are a transverse residual component and a longitudinal residual component calibrated according to the size of the vehicle, so that the residual observed by the sensor when the center point is in an area occupied by the vehicle is minimal.

Specifically, in some embodiments, calibrating the center point residual may include: subtracting the corresponding second threshold from at least one of the transverse center point residual component and the longitudinal center point residual component in response to the at least one of the transverse center point residual component and the longitudinal center point residual component being greater than the corresponding second threshold; adding at least one of a transverse center point residual component and a longitudinal center point residual component to a corresponding third threshold in response to the at least one of the transverse center point residual component and the longitudinal center point residual component being less than the corresponding third threshold; and setting at least one of the transverse center point residual component and the longitudinal center point residual component to zero in response to a value of the at least one of the transverse center point residual component and the longitudinal center point residual component being between the respective second threshold and the respective third threshold.

In some embodiments, for the transverse center point residual component, the second threshold is half the second vehicle transverse dimension, the third threshold is half the negative of the second vehicle transverse dimension, and for the longitudinal center point residual component, the second threshold is half the second vehicle longitudinal dimension, the third threshold is half the negative of the second vehicle longitudinal dimension.

Specifically, for example, a projection ranging algorithm, a binocular ranging algorithm, and an observation variable center of a model corresponding to the binocular ranging algorithm, the observed position is related to an observation angle of a device where the sensor is located. The positions of the observation points at different viewing angles are different, and it is impossible to determine which point on the target vehicle is. To use these observed values, the transverse center point residual and the longitudinal center point residual may be calibrated according to Formulas (20)-(21), assuming that the distribution is uniform over the size of the vehicle.

$$r_l = \begin{cases} \tilde{r}_l - \frac{L}{2}, & \tilde{r}_l > \frac{L}{2} \\ 0, & -\frac{L}{2} \leq \tilde{r}_l \leq \frac{L}{2} \\ \tilde{r}_l + \frac{L}{2}, & \tilde{r}_l < -\frac{L}{2} \end{cases} \quad (20)$$

$$r_d = \begin{cases} \tilde{r}_d - \frac{W}{2}, & \tilde{r}_d > \frac{W}{2} \\ 0, & -\frac{W}{2} \leq \tilde{r}_d \leq \frac{W}{2} \\ \tilde{r}_d + \frac{W}{2}, & \tilde{r}_d < -\frac{W}{2} \end{cases} \quad (21)$$

$\tilde{r}_l$ and $\tilde{r}_d$ are respectively a longitudinal center point residual component and a transverse center point residual component before calibration, and $r_l$ and $r_d$ are respectively a longitudinal center point residual component and a transverse center point residual component after calibration. That is, the vehicle body center point observation of the target vehicle is to be output, but there is a deviation in the actual output, so the transverse center point residual and the longitudinal center point residual are calibrated according to the calibration Formulas (20)-(21).

According to some embodiments, optimizing the state variable of the target at each moment by minimizing a loss function may include at least one of: if the observation model outputs multiple coordinate values to the same reference point, the output of the observation model is discarded; and if a plurality of observation variables at the same time are output to the same reference point by a plurality of observation models, normalizing the sum of the squares of the weights of the horizontal residual component (horizontal reference point residual component) and the sum of the squares of the weights of the longitudinal reference point residual component (longitudinal reference point residual component) corresponding to the plurality of observation variables in the position loss, respectively.

In the state variable optimization process, the position factor and the velocity smoothing factor collide with each other. To smooth velocity, the weighted sum of squares of the position factors may be normalized when there is a plurality of position observed values.

Specifically, there are a plurality of observation models corresponding to the at least one sensor. When the observation variable includes a plurality of observed values output by the plurality of observation models for the center point of the target vehicle at the same time, the weighted sum of squares of the transverse center point residual components corresponding to the plurality of observed values in the position loss item is normalized, and the weighted sum of squares of the longitudinal center point residual components corresponding to the plurality of observed values in the position loss item.

When the observation variable includes a plurality of observed values output by a plurality of observation models for the same contour corner point of the target vehicle at the same time, the sum of squares of the transverse reference point residual components corresponding to the plurality of observed values in the position loss item is normalized, and the sum of squares of the longitudinal reference point residual components corresponding to the plurality of observed values in the position loss item is normalized.

According to some embodiments, the velocity loss includes at least one of: velocity prior loss and velocity smoothing loss; the velocity prior loss includes a residual between the velocity of the target at each present moment and the velocity after the last optimization; the velocity smoothing loss includes a residual between the velocity of the target at each present moment and the average velocity over a predetermined period of time at that present moment.

Specifically, in some embodiments, the observation variable includes a velocity of the target vehicle at each moment within the sliding time window, and the state variable includes a velocity of the target vehicle at each moment within the sliding time window. The velocity loss may then be determined based on a velocity residual calculated from the velocity in the observation variable and the velocity in the state variable.

When an observation model may provide velocity observation variable, such as a radar model, the velocity loss may also be added flexibly to the velocity residual loss. Assume that the observation variable of the $(l)^{th}$ observation model is: $\{(t_k, p_k^l, v_k^l)\}_{k=0}^{n-1}$ the velocity loss item $e_{ov}$ in Formula (22) needs to be added to the velocity loss Formula, wherein L represents the number of models that may provide velocity observation.

$$e_{ov} = \sum_{l \in L} \sum_{k=0}^{n-1} \rho(\|\lambda_k^l R_{bw}(v_k - v_k^l)\|_2^2) \quad (22)$$

In some embodiments, for example, the velocity vector observed by the radar model is unreliable, however, a velocity norm may be used. If only the velocity norm is available at this time, the velocity loss item may be as shown in Formula (23).

$$e_{ov} = \sum_{l \in L} \sum_{k=0}^{n-1} \rho(\|\lambda_k^l (v_k - v_k^l)\|_2^2) \quad (23)$$

In addition, or alternatively, in some embodiments, the state variable includes an average velocity of the target vehicle within the sliding time window, and the velocity loss item may be based on a velocity smoothing loss calculated from the velocity of the target vehicle at each moment within the sliding time window and the average velocity of the target vehicle within the sliding time window.

Specifically, to ensure velocity smoothing within the sliding time window, the velocity smoothing loss item shown in Formula (24) may be used to limit the velocity at each moment within the sliding time window to an average value.

$$w_a \sum_{k=0}^{n-1} \|R_{bw}(v_k - \bar{v})\|_2^2 \quad (24)$$

$w_a$ is a weight value corresponding to the velocity smoothing loss.

In some embodiments, the weight value w a may be determined based on the distance between the target vehicle and the vehicle or roadside device in which the plurality of sensors is located. For example, when the distance is greater than a preset threshold, the weight value is positively correlated with the distance; when the distance is not greater than the preset threshold, the weight value is a fixed value.

In some embodiments, the weight value w a for the velocity smoothing loss may be further determined based on a velocity change rate of the target vehicle calculated from the velocity of the target vehicle at each moment within the sliding time window. Specifically, the weight value when the velocity change rate is greater than the other preset threshold is smaller than the weight value when the velocity change rate is not greater than the other preset threshold.

In addition, or alternatively, in some embodiments, the sliding step size of the sliding time window is less than the length of the sliding time window, and the velocity loss may be determined based on the velocity prior loss. The velocity prior loss is calculated from: a velocity at each moment in an overlap region of a sliding time window and a previous sliding time window, and an optimized velocity at each moment in the overlap region in a state variable optimization process performed for the previous sliding time window.

Specifically, in order to retain the previously optimized information for each present moment, the velocity prior loss item as shown in Formula (25) may be used to limit the velocity at each instant in the sliding time window to be close to the last optimized velocity at that moment.

$$w_p \sum_{k=0}^{n-2} \|R_{bw}(v_k - \tilde{v}_k)\|_2^2 \quad (25)$$

Wherein, $\tilde{v}_k$ is the velocity after the last optimization at the present moment, and the value of k at this moment is from 0 to n−2, which represents that the sliding step length of the sliding time window at this moment is 1, and for $v_0$, $v_1, \ldots, v_{n-2}$, the optimal solution thereof has been obtained in the last optimization (the previous sliding time window); $w_p$ is the weight value corresponding to the velocity prior loss.

In some embodiments, the weight value may be determined based on the distance between the target vehicle and the vehicle or roadside device in which the plurality of sensors is located. When the distance is greater than a preset threshold, the weight value is positively correlated with the distance; when the distance is not greater than the preset threshold, the weight value is a fixed value.

In summary, the complete velocity loss item may be expressed as shown in Formula (26).

$$E_v = w_a \sum_{k=0}^{n-1} \|R_{bw}(v_k - \bar{v})\|_2^2 + w_p \sum_{k=0}^{n-2} \|R_{bw}(v_k - \tilde{v}_k)\|_2^2 + e_{ov} \quad (26)$$

According to some embodiments, the orientation loss item includes at least one of: an orientation prior loss of the first component, an orientation smoothing loss of the first component, an orientation prior loss of the second component, an orientation smoothing loss of the second component, and an angular velocity loss; the orientation prior loss includes a residual between the orientation variable of the target at each present moment and the orientation variable after the last optimization; the orientation smoothing loss includes a residual between an orientation of the target at each present moment and an average orientation within a predetermined time period including the present moment; the angular velocity loss includes a residual between a first rate of angular change and a second rate of angular change, the first rate of angular change is related to a vehicle size, a vehicle velocity, an angle of the first component, and an angle of the second component, the second rate of angular change is related to an angular change variable of the second component within a predetermined time interval.

In some embodiments, the target is a vehicle and the target vehicle includes only the first component (i.e., the primary structure), and the state variable includes an orientation of the target vehicle at each moment within the sliding time window. At this time, the orientation loss may include being based on an orientation residual calculated from an orientation of the target vehicle at each moment within the sliding time window and an orientation observed value of the target vehicle at each moment within the sliding time window.

Specifically, the orientation observation variable may directly form a constraint on orientation, and therefore the orientation loss item may be as shown in Formula (27).

$$\sum_{i \in L} \sum_{k=0}^{n-1} \rho(\|\lambda_k^l \sin(o_k - o_k^l)\|_2^2) \quad (27)$$

Wherein L is a set of different observation sources, and $\lambda_k^l$ is the weight corresponding to the (l)$^{th}$ observation source, which may be calculated as shown in Formula (19). For velocity-based orientation observation, the weights $\lambda_k$ may be calculated from Formula (28).

$$\lambda_k = w_v \frac{v_k}{a} \quad (28)$$

Wherein $w_v$ and a are hyperparameters.

In some embodiments, the orientation observed value may be a vehicle body orientation, a lane line orientation, or a velocity direction of the target vehicle observed by the at least one observation model. In some embodiments, in order to optimize orientation, when no reliable orientation observation is given, the vehicle should follow the lane, then the lane line orientation of the lane at that time may be considered as an orientation observed value with a fixed variance; furthermore, the velocity direction may also be regarded as an orientation observation, and the higher the velocity, the smaller the difference between the velocity direction and the vehicle orientation.

Like the velocity loss, the orientation loss has a similar smoothing loss item and a prior loss item. In some embodiments, the state variable further includes an average orientation of the first component of the target vehicle within the sliding time window, so the orientation loss may be calculated based on an orientation smoothing loss calculated from the orientation state variable of the target vehicle at each moment in the sliding time window and the average orientation state variable of the target vehicle within the sliding time window.

In some embodiments, the sliding step size of the sliding time window is less than the length of the sliding time window. At this time, the orientation loss is further calculated based on the orientation prior loss, which is calculated from: an orientation state variable at each moment in an overlap region of a sliding time window and a previous sliding time window, and an optimized orientation state variable at each moment in the overlap region in a state variable optimization process performed for the previous sliding time window.

Specifically, the smoothing loss item and the prior loss item towards the loss may be as shown in Formulas (29) and (30), respectively.

$$w_a \sum_{k=0}^{n-1} \|\sin(o_k - \bar{o})\|_2^2 \quad (29)$$

$$w_p \sum_{k=0}^{n-2} \|\sin(o_k - \tilde{o})\|_2^2 \quad (30)$$

Wherein $\tilde{o}_k$ is the orientation after the last optimization at the present moment (in this case, it is assumed that the sliding step length of the sliding time window is 1), and $\bar{o}$ is the average orientation within the current sliding time window.

In some embodiments, the target vehicle is a vehicle, such as a truck, that includes a first component and a second component. The first and second components may form a structural constraint there between by means of a pivot structure (hinge). The state variable includes an orientation of the first component at each moment in the sliding time window and an orientation of the second component at each moment in the sliding time window.

Thus, in some embodiments, the orientation loss may be based on a first component orientation residual and a second component orientation residual, wherein the first component orientation residual is calculated from an orientation of the first component at each moment within the sliding time window and an orientation observed value of the first component at each moment within the sliding time window, and the second component orientation residual is calculated from an orientation of the second component at each moment within the sliding time window and an orientation observed value of the second component at each moment within the sliding time window. The first component orientation residual and the first component orientation residual may be referred to above and will not be described in detail herein.

In some embodiments, the orientation observed value of the first component is an orientation of the first component, a lane line orientation, or a velocity direction of the first component observed by the at least one observation model, and the orientation observed value of the second component is an orientation of the second component, a lane line orientation, or a velocity direction of the second component observed by the at least one observation model.

In some embodiments, the state variable includes an average orientation of the first component within the sliding time window, and thus, the orientation loss may include an orientation smoothing loss of the first component calculated from the orientation of the first component at each moment within the sliding time window and the average orientation of the first component within the sliding time window.

In some embodiments, the sliding step size of the sliding time window is less than the length of the sliding time window. Thus, the orientation loss may include an orientation prior loss of the first component calculated from: an orientation of the first component at each moment in a region of overlap of the sliding time window and a previous sliding time window, and an optimized orientation of the first component at each moment in the region of overlap in a state variable optimization process performed for the previous sliding time window.

In some embodiments, the observation variable includes a length of the second component observed at each moment in the sliding time window and a length of the pivot structure (hinge) forming the structural constraint observed at each moment in the sliding time window. The state variable includes the velocity of the target vehicle at each moment in the sliding time window, the orientation of the first component at each moment in the sliding time window, and the orientation of the second component at each moment in the sliding time window. At this time, the orientation loss may include an angular velocity loss calculated from: a velocity of the target vehicle at each moment in the sliding time window, a length of the second component observed at each moment in the sliding time window, a length of the pivot structure observed at each moment in the sliding time window, an orientation of the first component at each moment in the sliding time window, and an orientation of the second component at each moment in the sliding time window.

Specifically, there is also a motion constraint shown in Formula (9) for the second component's orientation observation. The angular velocity loss may then be as shown in Formula (31).

$$w_v \sum_{k=0}^{n-2} \left\| \frac{v_k}{L_t + L_h}\sin(o_k - \beta_k) - \left(\frac{\beta_{k+1} - \beta_k}{\Delta t_k}\right) \right\|_2^2 \quad (31)$$

Wherein $L_t$ and $L_h$ are the lengths of the first component and the pivot structure, respectively, in a manner which will be described below with reference to the size loss.

In summary, the complete orientation loss item may be expressed as shown in Formula (32).

$$E_o = \sum_{i \in L} \sum_{k=0}^{n-1} \rho(\|\lambda_k^i \sin(o_k - o_k^i)\|_2^2) + \quad (32)$$

$$\sum_{i \in L} \sum_{k=0}^{n-1} \rho(\|\mu_k^i \sin(\beta_k - \beta_k^i)\|_2^2) + w_a \sum_{k=0}^{n-1} \|\sin(o_k - \bar{o})\|_2^2 +$$

$$w_p \sum_{k=0}^{n-2} \|\sin(o_k - \tilde{o}_k)\|_2^2 + w_v \sum_{k=0}^{n-2} \left\| \frac{v_k}{L_t + L_h}\sin(o_k - \beta_k) - \left(\frac{\beta_{k+1} - \beta_k}{\Delta t_k}\right) \right\|_2^2$$

In some embodiments, the orientation observed by, for example, a radar sensor or the like, may flip 180 degrees, for example, the velocity direction may be 180 degrees different from the vehicle body orientation when the vehicle is reversing. Therefore, in optimizing the state variable by minimizing the loss function, it is possible to correct the vehicle body orientation, including: when the difference between the orientation state variable of the target vehicle optimized by the current sliding time window and the orientation observed value at the corresponding moment in the current sliding time window is greater than 90 degrees, the orientation observed value is flipped by 180 degrees; and when the number of times of flipping the orientation observed value under the sliding time window successively exceeds a preset value, the orientation state variable under the sliding time window is flipped by 180 degrees.

According to some embodiments, the size loss item includes at least one of: the size prior loss and the optimized size accumulating loss at each moment; the size prior loss includes a residual between the size of the target at each present moment and the last optimized size; the size accumulating loss includes the sum of the size losses of the target from the initial moment to the last optimized moment.

In some embodiments, the sliding step size of the sliding time window is less than the length of the sliding time window. Thus, the size loss item may include a size prior loss calculated from: a size of a target at each moment in an overlap region of a sliding time window and a previous sliding time window, and an optimized size of a target at each moment in the overlap region in a state variable optimization process performed for the previous sliding time window.

According to some embodiments, the size accumulating loss is calculated using an incremental update method; the observation variable of the target at each moment is an observation variable of the target at each moment within the sliding time window; the state variable of the target at each moment is a state variable of the target at each moment within the sliding time window; the sliding time window includes a plurality of data moments, and the moments are at least two of the plurality of data moments.

Specifically, the size accumulating loss includes a sum of the size losses of the target from the initial moment to the last optimized moment. The initial moment is a moment optimization of the state variable is initially started, e.g., an acquired first frame data moment. The last optimization moment may be, for example, the last moment within the previous time sliding window. Illustratively, the target vehicle contour observation may provide dimensional information of the target vehicle, and therefore, the size accumulating loss may be calculated from: a size loss determined based on a reference point residual for each moment that does not fall within a current sliding time window and falls within a previous sliding time window, and a size accumulating loss used in a state variable optimization process performed for the previous sliding time window.

In some embodiments, the observation variable includes contour corner point coordinates of the target vehicle at each moment within the sliding time window and center point coordinates of the target vehicle at each moment within the sliding time window. The state variable includes the velocity of the target vehicle at each moment within the sliding time window, and the reference point residual corresponding to each moment is calculated from: a center point coordinate observation variable of the target vehicle at the moment, a contour corner point coordinate observation variable of the target vehicle at the moment, and a corresponding vector from the center point coordinate observation variable of the target vehicle at the moment to the contour corner point coordinate observation variable, and the corresponding vector can be determined according to Formula (17).

Specifically, in the optimization framework, the body size or the tractor size of the truck is considered as a global variable to be optimized. When the current state is updated, the oldest frame will be removed and will not be updated again. Although the state variable outside the sliding window is fixed, they may also provide some information about the global size variable. Specifically, when the $(i)^{th}$ frame is eliminated, a new size loss may be generated if contour observation $z_k^l$, is available, as shown in Formula (33).

$$\left\| \gamma \mu_k^i R_{bw} \left( \begin{bmatrix} \cos o_i & -\sin o_i \\ \sin o_i & \cos o_i \end{bmatrix} \begin{bmatrix} \delta_m L \\ \eta_m W \end{bmatrix} + p_i - z_i^l \right) \right\|_2^2 = \left\| A_i^l \begin{bmatrix} L \\ W \end{bmatrix} + b_i^l \right\|_2^2 \quad (33)$$

Wherein $A_i^l$ and $b_i^l$ are a constant and $\mu_k^i = \text{diag}(\mu_0, \mu_1)$ is the weight calculated from the variance in Formula (19).

Since the Laplacian distribution may be expressed equivalently as the product of a Gaussian distribution and an inverse Gaussian distribution, in some examples, then $\gamma = \text{diag}(\gamma_0, \gamma_1)$ may be used to approximate the L2 item of the Huber loss function, as shown in Formula (34), for better robustness.

$$\gamma_i = \begin{cases} 1, & r_i \leq \delta \\ \sqrt{\dfrac{2\delta}{r_i}}, & r_i > \delta \end{cases} \quad (34)$$

Wherein $\delta$ represents a preset parameter, and $r_i$ represents $$R_{bw} \left( \begin{bmatrix} \cos o_i & -\sin o_i \\ \sin o_i & \cos o_i \end{bmatrix} \begin{bmatrix} \delta_m L \\ \eta_m W \end{bmatrix} + p_i - z_i^l \right)$$

in Formula (33).

The number of size loss items may increase over time, and in order to avoid redundant calculations, in embodiments according to the present disclosure, they are combined into one item in an incremental manner so that the loss item at time Ti may be expressed as shown in Formula (35).

$$\left\| A_i \begin{bmatrix} L \\ W \end{bmatrix} + b_i \right\|_2^2 = \left\| A_{i-1} \begin{bmatrix} L \\ W \end{bmatrix} + b_{i-1} \right\|_2^2 + \left\| A_i^l \begin{bmatrix} L \\ W \end{bmatrix} + b_i^l \right\|_2^2 + C \quad (35)$$

Wherein $A_i$ may be calculated by the SVD decomposition method, as shown in Formulas (36)-(38):

$$A_i^T A_i = A_{i-1}^T A_{i-1} + A_i^{lT} A_i^l = U \Sigma V^T \quad (36)$$

$$= U \Lambda \Lambda^T V^T = U \Lambda V^T (U \Lambda V^T)^T \quad (37)$$

$$A_i = (U \Lambda V^T)^T \quad (38)$$

Wherein $A_{i-1}{}^T A_{i+1} + A_i{}^{lT} A_i{}^l$ is a symmetric matrix such that U=V. $b_i$ may be as shown in Formula (39).

$$b_i = A_i^{-T}(A_{i-1}{}^T A_{i-1} + A_i{}^{lT} A_i{}^l) \quad (39)$$

In some embodiments, in an example where the target includes a first component and a second component, such as a truck model as shown in FIG. 2, the trailer and the size of the pivot structure connecting the trailer and the tractor may be calculated from observation variable as shown in Formulas (40)-(42) below.

$$L_t = \frac{1}{n} \sum_{k=0}^{n-1} L_k \quad (40)$$

-continued $$W_t = \frac{1}{n}\sum_{k=0}^{n-1} W_k \quad (41)$$

$$L_h = \frac{1}{n}\sum_{k=0}^{n-1} L_{hk} \quad (43)$$

Here, Formulas (40)-(42) are solutions to the optimization problem, as shown in Formula (43).

$$\min_{L_t, W_t, L_h} \sum_{k=0}^{n-1} \left( \left\| L_t - L_k \right\|_2^2 + \left\| W_t - W_k \right\|_2^2 + \left\| L_h - L_M \right\|_2^2 \right) \quad (43)$$

In summary, knowing the prior loss of L and W, the total size loss item may be as shown in Formula (44).

$$E_s = \left\| A \begin{bmatrix} L \\ W \end{bmatrix} + b \right\|_2^2 + \lambda \left\| \begin{bmatrix} L \\ W \end{bmatrix} - \begin{bmatrix} \tilde{L} \\ \tilde{W} \end{bmatrix} \right\|_2^2 \quad (44)$$

The first term in $E_s$ is a size accumulating loss, and the second term is the size prior loss.

In the present disclosure, based on a loss function including at least one of a position loss, an orientation loss, a velocity loss, a size loss, and a structural constraint of a target, the state variable of the target at each moment may be optimized by minimizing the loss function, thereby obtaining optimized state variables. In the field of unmanned driving, the method according to the present disclosure may update the status information of the surrounding vehicles more accurately so that the unmanned driving system makes safe path planning based on the result, thereby avoiding traffic accidents.

Figure 5:
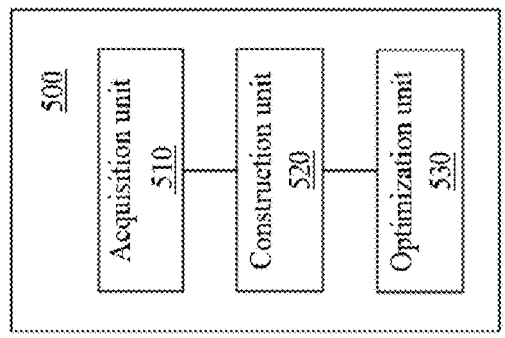
FIG. 5 is a block diagram illustrating a structure of a target state estimating apparatus according to an exemplary embodiment.

According to an embodiment of the present disclosure, as shown in FIG. 5, further provided is a target state estimating apparatus 500 including: an acquisition unit 510 configured to acquire observation variables for a target by a plurality of sensors, wherein at least one of the observation variables is acquired by each sensor; a construction unit 520 configured to determine a to-be-optimized state variable for the target based on the observation variables; and an optimization unit 530 configured to optimize the state variable of the target at each moment by minimizing a loss function to obtain an optimized state variable of the target at each moment. The loss function includes at least one of a position loss, an orientation loss, a velocity loss, a size loss, and a structural constraint of the target.

Figure 6:
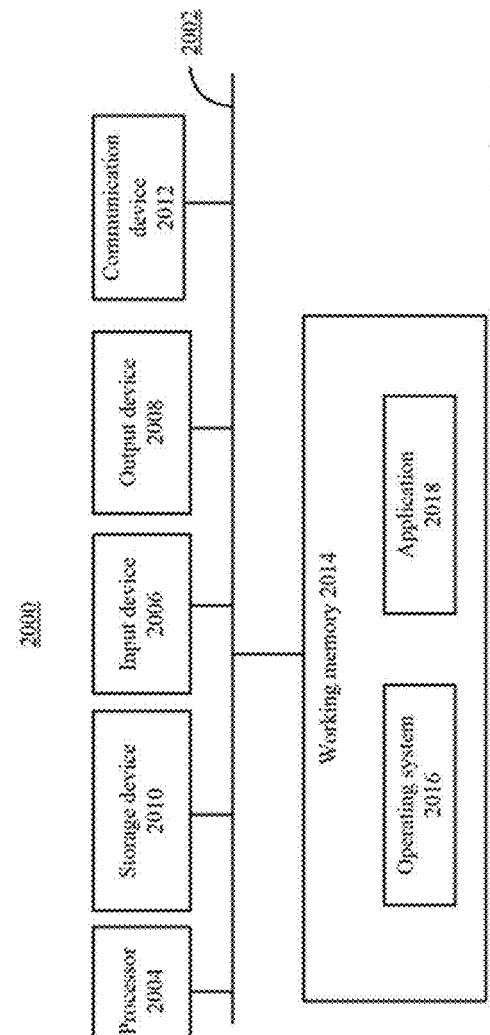
FIG. 6 is a block diagram illustrating an exemplary computing device that may be applied to an exemplary embodiment.

Referring to FIG. 6, a computing device 2000, which is an example of a hardware device that may be applied to aspects of the present disclosure, will now be described. The computing device 2000 may be any machine configured to perform processing and/or computing, and may be, but is not limited to, a workstation, a server, a desktop computer, a laptop computer, a tablet computer, a personal digital assistant, a smart phone, an on-board computer, or any combination thereof. The above-described target state estimating apparatus may be implemented in whole or at least in part by the computing device 2000 or similar device or system.

The computing device 2000 may include elements coupled to or in communication with bus 2002, possibly via one or more interfaces. For example, the computing device 2000 may include a bus 2002, one or more processors 2004, one or more input devices 2006, and one or more output devices 2008. The one or more processors 2004 may be any type of processor and may include, but are not limited to, one or more general-purpose processors and/or one or more special-purpose processors (e.g., special processing chips). Input device 2006 may be any type of device capable of inputting information to computing device 2000 and may include, but is not limited to, a mouse, a keyboard, a touch screen, a microphone, and/or a remote control. The output device 2008 may be any type of device capable of presenting information and may include, but is not limited to, a display, a speaker, a video/audio output terminal, a vibrator, and/or a printer. The computing device 2000 may also include or be connected to a non-transitory storage device 2010, which may be any storage device that is non-transitory and that may enable storage of data, and may include, but is not limited to, a magnetic disk drive, an optical storage device, a solid state memory, a floppy disk, a flexible disk, a hard disk, a magnetic tape, or any other magnetic medium, an optical disk, or any other optical medium, a ROM, a RAM, a cache memory, and/or any other memory chip or cartridge, and/or any other medium from which a computer may read data, instructions and/or code. The non-transitory storage device 2010 may be removable from the interface. The non-transitory storage device 2010 may have data/programs (including instructions)/code for implementing the methods and steps described above. The computing device 2000 may also include a communication device 2012. The communication device 2012 may be any type of device or system that enables communication with external devices and/or with a network, and may include, but is not limited to, a modem, a network card, an infrared communication device, a wireless communication device, and/or a chipset, such as a Bluetooth™ device, a 1302.11 device, a WiFi device, a WiMax device, a cellular communication device, and/or the like.

The computing device 2000 may also include a working memory 2014, which may be any type of working memory that may store programs (including instructions) and/or data useful for the operation of processor 2004, and may include, but is not limited to, random access memory and/or read-only memory devices.

Software elements (programs) may be located in the working memory 2014, including but not limited to an operating system 2016, one or more applications 2018, drivers, and/or other data and code. Instructions for performing the methods and steps described above may be included in one or more applications 2018, and the various elements of the target state estimating apparatus described above etc. may be implemented by the processor 2004 reading and executing instructions of one or more applications 2018. More specifically, the acquisition unit 510 of another afore-mentioned target state estimating apparatus may be implemented, for example, by the processor 2004 executing the application 2018 with instructions to execute step 110. The construction unit 520 of another afore-mentioned target state estimating apparatus may be implemented, for example, by the processor 2004 executing the application 2018 with instructions to execute step 120. Furthermore, the optimization unit 530 of another afore-mentioned target state estimating apparatus may be implemented, for example, by the processor 2004 executing the application 2018 with instructions to execute step 130. Executable code or source code for the instructions of the software elements (programs) may be stored in a non-transitory computer-readable storage medium, such as the storage device 2010 described above, and when executed may be stored in a working memory 2014 (possibly compiled and/or installed). Executable code or source code for the instructions of the software elements (programs) may also be downloaded from a remote location.

It will also be appreciated that various modifications may be made in accordance with specific requirements. For example, custom hardware may also be used, and/or particular elements may be implemented in hardware, software, firmware, middleware, microcode, a hardware description language, or any combination thereof. For example, some or all the disclosed methods and devices may be implemented by programming hardware (e.g., programmable logic circuits including field programmable gate arrays (FPGA) and/or programmable logic arrays (PLA)) in an assembly language or a hardware programming language (such as VERILOG, VHDL, C++) using logic and algorithms according to the present disclosure.

It should also be understood that the foregoing method may be implemented in a server-client mode. For example, a client may receive data input by a user and send the data to a server. The client may also receive data input by the user, perform some of the processing in the afore-mentioned method, and send the data resulting from the processing to the server. The server may receive the data from the client and perform the afore-mentioned method or another part of the afore-mentioned method and return the results of the execution to the client. The client may receive the results of the execution of the method from the server and may, for example, be presented to the user via an output device.

It should also be appreciated that the components of the computing device 2000 may be distributed across a network. For example, some processes may be performed using one processor while other processes may be performed by another processor remote from the one processor. Other components of the computing system 2000 may also be similarly distributed. As such, the computing device 2000 may be interpreted as a distributed computing system that performs processing at multiple locations.

Although embodiments or examples of the present disclosure have been described with reference to the accompanying drawings, it is to be understood that the above-described methods, systems, and devices are merely exemplary embodiments or examples, and that the scope of the present invention is not limited by these embodiments or examples, but is defined only by the appended claims and their equivalents. Various elements of the embodiments or examples may be omitted or replaced with equivalents thereof. Furthermore, steps may be performed in an order other than that described in the present disclosure. Further, various elements of the embodiments or examples may be combined in various ways. Importantly, as technology evolves, many of the elements described herein may be replaced with equivalent elements that emerge from the present disclosure.

What is claimed is:

1. A method for state estimation of a target, comprising:
    obtaining an observation variable of the target at different moments through a plurality of sensors, wherein at least one observation variable is acquired by each sensor; determining a state variable of the target at different moments based on the observation variable; and
    optimizing the state variable of the target by minimizing a loss function, wherein the state variable comprises at least one of a velocity, a position, an orientation, or a size of the target;
    wherein the loss function comprises at least one of a position loss, an orientation loss, a velocity loss, a size loss, or a structural constraint of the target;
    wherein the observation variable is obtained by an observation model corresponding to each sensor, and the optimizing the state variable of the target by minimizing the loss function comprises:
    in response to the observation model outputting multiple coordinate values corresponding to a same reference point, discarding the output of the observation model.

2. The method according to claim 1, wherein the observation variable comprises at least one of:
    at least one of a velocity, a position, or an orientation of the target; or
    a size of the target comprising at least one of a length, a width, or a height; and
    the state variable further comprises at least one of:
    an average velocity, an average position, or an average orientation of the target in a predetermined period of time to which each moment belongs.

3. The method according to claim 2, wherein
    the target is a vehicle comprising a first component and at least one second component rotatable about the first component;
    the position of the target comprises at least one of: a position of the first component, a position of at least one of the second components, or a position of the vehicle;
    the size of the target comprises at least one of: a size of the first component, a size of at least one of the second components, or a size of the vehicle; and
    the orientation of the target comprises at least one of: a direction of the velocity, an orientation of the first component, or a direction of a lane in which the vehicle is located.

4. The method according to claim 3, wherein
    the loss function comprises the orientation loss comprising at least one of: an orientation prior loss of the first component, an orientation smoothing loss of the first component, an orientation prior loss of the second component, an orientation smoothing loss of the second component, or an angular velocity loss;
    the orientation prior loss comprises a residual between the orientation variable of the target at each present moment and the orientation variable after the last optimization;
    the orientation smoothing loss comprises a residual between an orientation of the target at each present moment and an average orientation within a predetermined time period comprising the present moment; and
    the angular velocity loss comprises a residual between a first rate of angular change and a second rate of angular change, the first rate of angular change being related to a vehicle size, a vehicle velocity, an angle of the first component, and an angle of the second component, and the second rate of angular change is related to an angular change variable of the second component within a predetermined time interval.

5. The method according to claim 2, wherein
    the position comprises a position of at least one reference point comprising at least one of: a center point or a contour corner point;
    the position loss comprises at least one reference point residual comprising at least one of: a center point residual representing a difference of an observation variable and a state variable of the center point or a contour corner point residual representing a difference of an observation variable and an state variable of the contour corner point, wherein each of the center point residual and the contour corner point residual corresponds to a first weight, wherein the first weight is a diagonal matrix;

each of the center point residual and the contour corner point residual comprises a transverse residual component and a longitudinal residual component, wherein each of the transverse residual component and the longitudinal residual component corresponds to a second weight;

in response to the transverse variance of one of the center point residual and the contour corner residual being less than a first predetermined threshold, the weight of the transverse residual component takes a first fixed value; and in response to the longitudinal variance of one of the center point residual and the contour corner point residual being less than a second predetermined threshold, the weight of the longitudinal residual component takes the first fixed value;

the target is a vehicle, and the transverse residual component and the longitudinal residual component in the residual of the center point are obtained by calibrating according to a size of the vehicle, so that the center point residual observed by the sensor is minimal when the center point is located in an area occupied by the vehicle, wherein the transverse residual component is perpendicular to a lane orientation in which the vehicle is located, and the longitudinal residual component is parallel to the lane orientation in which the vehicle is located; or the transverse residual component is perpendicular to the vehicle body orientation of the vehicle, and the longitudinal residual component is parallel to the vehicle body orientation of the vehicle.

6. The method according to claim 1, wherein the plurality of sensors comprises at least one of: an image acquisition apparatus or a point cloud acquisition apparatus;

wherein the observation model comprises at least one of: an image-based binocular ranging algorithm, an image-based monocular ranging algorithm, a point cloud-based ranging algorithm, an image-map-based projection ranging algorithm, or a point cloud-map-based projection ranging algorithm; and the optimizing the state variable of the target by minimizing the loss function further comprises:

in response to a plurality of observation models outputting a plurality of observation variables corresponding to the same reference point at a same time, normalizing a weighted sum of squares of residual components of horizontal reference points and a weighted sum of squares of the residual components of longitudinal reference points corresponding to the plurality of observation variables in the position loss.

7. The method according to claim 1, wherein the loss function comprises the velocity loss and size loss;

the velocity loss comprises at least one of: velocity prior loss or velocity smoothing loss, wherein the velocity prior loss comprises a residual between a velocity of the target at a present moment and a velocity after the last optimization; and the velocity smoothing loss comprises a residual between the velocity of the target at the present moment and an average velocity within a predetermined period of time corresponding to the present moment; and the size loss comprises at least one of: a size prior loss or the optimized size accumulating loss, wherein the size prior loss comprises a residual between the size of the target at a present moment and a last optimized size; and the size accumulating loss comprises a sum of size losses of the target from the initial moment to the last optimized moment.

8. The method according to claim 1, wherein the target comprises at least two components, the loss function comprises the structural constraint between the at least two components, the position of the target comprises a position of each of the at least two components.

9. The method according to claim 1, wherein the at least two components are connected by a pivot structure.

10. An electronic device, comprising:

at least one processor; and a memory communicatively connected to the at least one processor; wherein the memory stores an instruction executable by the at least one processor, and the instruction is executed by the at least one processor to enable the at least one processor to execute a method for state estimation of a target, comprising:

obtaining an observation variable of the target at different moments through a plurality of sensors, wherein at least one observation variable is acquired by each sensor;

determining a state variable of the target at different moments based on the observation variable; and optimizing the state variable of the target by minimizing a loss function, wherein the state variable comprises at least one of a velocity, a position, an orientation, or a size of the target;

wherein the loss function comprises at least one of a position loss, an orientation loss, a velocity loss, a size loss, or a structural constraint of the target;

wherein the observation variable is obtained by an observation model corresponding to each sensor, and the optimizing the state variable of the target by minimizing the loss function comprises:

in response to the observation model outputting multiple coordinate values corresponding to a same reference point, discarding the output of the observation model.

11. The device according to claim 10, wherein the target is a vehicle comprising a first component and at least one second component rotatable about the first component;

the position of the target comprises at least one of: a position of the first component, a position of at least one of the second components, or a position of the vehicle; the size of the target comprises at least one of: a size of the first component, a size of at least one of the second components, or a size of the vehicle;

the orientation of the target comprises at least one of: a direction of the velocity, an orientation of the first component, or a direction of a lane in which the vehicle is located; and the orientation loss comprises at least one of: an orientation prior loss of the first component, an orientation smoothing loss of the first component, an orientation prior loss of the second component, an orientation smoothing loss of the second component, or an angular velocity loss, wherein the orientation prior loss comprises a residual between the orientation variable of the target at each present moment and the orientation variable after the last optimization;

the orientation smoothing loss comprises a residual between an orientation of the target at each present moment and an average orientation within a predetermined time period comprising the present moment; and the angular velocity loss comprises a residual between a first rate of angular change and a second rate of angular change, the first rate of angular change being related to a vehicle size, a vehicle velocity, an angle of the first component, and an angle of the second component, and the second rate of angular change is related to an angular change variable of the second component within a predetermined time interval.

12. The device according to claim 10, wherein the plurality of sensors comprises at least one of: an image acquisition apparatus or a point cloud acquisition apparatus;

the observation model comprises at least one of: an image-based binocular ranging algorithm, an image-based monocular ranging algorithm, a point cloud-based ranging algorithm, an image-map-based projection ranging algorithm, or a point cloud-map-based projection ranging algorithm; and the optimizing the state variable of the target by minimizing the loss function further comprises:

in response to a plurality of observation models outputting a plurality of observation variables corresponding to the same reference point at a same time, normalizing a weighted sum of squares of residual components of horizontal reference points and a weighted sum of squares of the residual components of longitudinal reference points corresponding to the plurality of observation variables in the position loss.

13. The device according to claim 10, wherein the position comprises a position of at least one reference point comprising at least one of: a center point or a contour corner point;

the position loss comprises at least one reference point residual comprising at least one of: a center point residual representing a difference of an observation variable and a state variable of the center point or a contour corner point residual representing a difference of an observation variable and an state variable of the contour corner point, wherein each of the center point residual and the contour corner point residual corresponds to a first weight, wherein the first weight is a diagonal matrix;

each of the center point residual and the contour corner point residual comprises a transverse residual component and a longitudinal residual component, wherein each of the transverse residual component and the longitudinal residual component corresponds to a second weight;

in response to the transverse variance of one of the center point residual and the contour corner residual being less than a first predetermined threshold, the weight of the transverse residual component takes a first fixed value; and in response to the longitudinal variance of one of the center point residual and the contour corner point residual being less than a second predetermined threshold, the weight of the longitudinal residual component takes the first fixed value;

the target is a vehicle, and the transverse residual component and the longitudinal residual component in the residual of the center point are obtained by calibrating according to a size of the vehicle, so that the center point residual observed by the sensor is minimal when the center point is located in an area occupied by the vehicle, wherein the transverse residual component is perpendicular to a lane orientation in which the vehicle is located, and the longitudinal residual component is parallel to the lane orientation in which the vehicle is located; or the transverse residual component is perpendicular to the vehicle body orientation of the vehicle, and the longitudinal residual component is parallel to the vehicle body orientation of the vehicle.

14. The device according to claim 10, wherein the velocity loss comprises at least one of: velocity prior loss or velocity smoothing loss, wherein the velocity prior loss comprises a residual between a velocity of the target at a present moment and a velocity after the last optimization; and the velocity smoothing loss comprises a residual between the velocity of the target at the present moment and an average velocity within a predetermined period of time corresponding to the present moment; and the size loss comprises at least one of: a size prior loss or the optimized size accumulating loss, wherein the size prior loss comprises a residual between the size of the target at a present moment and a last optimized size; and the size accumulating loss comprises a sum of size losses of the target from the initial moment to the last optimized moment.

15. A non-transitory computer-readable storage medium storing a computer instruction, wherein the computer instruction is used for causing the computer to execute a method for state estimation of a target, comprising:

obtaining an observation variable of the target at different moments through a plurality of sensors, wherein at least one observation variable is acquired by each sensor;

determining a state variable of the target at different moments based on the observation variable; and optimizing the state variable of the target by minimizing a loss function, wherein the state variable comprises at least one of a velocity, a position, an orientation, or a size of the target;

wherein the loss function comprises at least one of a position loss, an orientation loss, a velocity loss, a size loss, or a structural constraint of the target;

wherein the observation variable is obtained by an observation model corresponding to each sensor, and the optimizing the state variable of the target by minimizing the loss function comprises:

in response to the observation model outputting multiple coordinate values corresponding to a same reference point, discarding the output of the observation model.

16. The medium according to claim 14, wherein the target is a vehicle comprising a first component and at least one second component rotatable about the first component;

the position of the target comprises at least one of: a position of the first component, a position of at least one of the second components, or a position of the vehicle;

the size of the target comprises at least one of: a size of the first component, a size of at least one of the second components, or a size of the vehicle; and the orientation of the target comprises at least one of: a direction of the velocity, an orientation of the first component, or a direction of a lane in which the vehicle is located.

17. The medium according to claim 15, wherein
the plurality of sensors comprises at least one of: an image acquisition apparatus or a point cloud acquisition apparatus;
wherein the observation model comprises at least one of: an image-based binocular ranging algorithm, an image-based monocular ranging algorithm, a point cloud-based ranging algorithm, an image-map-based projection ranging algorithm, or a point cloud-map-based projection ranging algorithm; and
the optimizing the state variable of the target by minimizing the loss function further comprises:
in response to a plurality of observation models outputting a plurality of observation variables corresponding to the same reference point at a same time, normalizing a weighted sum of squares of residual components of horizontal reference points and a weighted sum of squares of the residual components of longitudinal reference points corresponding to the plurality of observation variables in the position loss.

18. The medium according to claim 17, wherein
the loss function comprises the orientation loss comprising at least one of: an orientation prior loss of the first component, an orientation smoothing loss of the first component, an orientation prior loss of the second component, an orientation smoothing loss of the second component, or an angular velocity loss;
the orientation prior loss comprises a residual between the orientation variable of the target at each present moment and the orientation variable after the last optimization;
the orientation smoothing loss comprises a residual between an orientation of the target at each present moment and an average orientation within a predetermined time period comprising the present moment; and
the angular velocity loss comprises a residual between a first rate of angular change and a second rate of angular change, the first rate of angular change being related to a vehicle size, a vehicle velocity, an angle of the first component, and an angle of the second component, and the second rate of angular change is related to an angular change variable of the second component within a predetermined time interval.

19. The medium according to claim 15, wherein
the position comprises a position of at least one reference point comprising at least one of: a center point or a contour corner point;
the position loss comprises at least one reference point residual comprising at least one of: a center point residual representing a difference of an observation variable and a state variable of the center point or a contour corner point residual representing a difference of an observation variable and an state variable of the contour corner point, wherein
each of the center point residual and the contour corner point residual corresponds to a first weight, wherein the first weight is a diagonal matrix;
each of the center point residual and the contour corner point residual comprises a transverse residual component and a longitudinal residual component, wherein each of the transverse residual component and the longitudinal residual component corresponds to a second weight;
in response to the transverse variance of one of the center point residual and the contour corner residual being less than a first predetermined threshold, the weight of the transverse residual component takes a first fixed value; and
in response to the longitudinal variance of one of the center point residual and the contour corner point residual being less than a second predetermined threshold, the weight of the longitudinal residual component takes the first fixed value;
the target is a vehicle, and
the transverse residual component and the longitudinal residual component in the residual of the center point are obtained by calibrating according to a size of the vehicle, so that the center point residual observed by the sensor is minimal when the center point is located in an area occupied by the vehicle, wherein
the transverse residual component is perpendicular to a lane orientation in which the vehicle is located, and the longitudinal residual component is parallel to the lane orientation in which the vehicle is located; or
the transverse residual component is perpendicular to the vehicle body orientation of the vehicle, and the longitudinal residual component is parallel to the vehicle body orientation of the vehicle.

20. The medium according to claim 15, wherein
the loss function comprises the velocity loss comprising at least one of: velocity prior loss or velocity smoothing loss, wherein
the velocity prior loss comprises a residual between a velocity of the target at a present moment and a velocity after the last optimization; and
the velocity smoothing loss comprises a residual between the velocity of the target at the present moment and an average velocity within a predetermined period of time corresponding to the present moment; and
the size loss comprises at least one of: a size prior loss or the optimized size accumulating loss, wherein
the size prior loss comprises a residual between the size of the target at a present moment and a last optimized size; and
the size accumulating loss comprises a sum of size losses of the target from the initial moment to the last optimized moment.

* * * * *